(12) United States Patent
Raveh et al.

(10) Patent No.: US 10,133,587 B2
(45) Date of Patent: Nov. 20, 2018

(54) GENERATING COMPONENT PAGES TO RENDER IN A CONFIGURATION PAGE IN A GRAPHICAL USER INTERFACE TO CONFIGURE A COMPUTING RESOURCE

(71) Applicant: International Business Machines Corporation, Armonk, NY (US)

(72) Inventors: Yoni Raveh, Modin (IL); Gal Sinay, Tel Aviv (IL); Moshe Weiss, Petah Tiqwa (IL); Malki Wiegner, Kiryat Ata (IL)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 14/925,853

(22) Filed: Oct. 28, 2015

(65) Prior Publication Data
US 2017/0123642 A1    May 4, 2017

(51) Int. Cl.
*G06F 3/048* (2013.01)
*G06F 9/451* (2018.01)

(52) U.S. Cl.
CPC .................... *G06F 9/451* (2018.02)

(58) Field of Classification Search
CPC ...... G06Q 10/00; H04L 41/0213; G06F 9/451
USPC .................................. 715/777, 771
See application file for complete search history.

(56) References Cited

U.S. PATENT DOCUMENTS

| | | | | |
|---|---|---|---|---|
| 5,999,179 | A * | 12/1999 | Kekic | H04L 41/0213 715/734 |
| 8,024,670 | B1 * | 9/2011 | Rahmatian | G06Q 10/00 705/320 |
| 2005/0188268 | A1 | 8/2005 | Verbowski et al. | |
| 2010/0210349 | A1 * | 8/2010 | Blair | A63F 13/10 463/23 |
| 2011/0314138 | A1 | 12/2011 | Kobayashi et al. | |
| 2015/0149424 | A1 | 5/2015 | Margalit et al. | |

* cited by examiner

*Primary Examiner* — Andrey Belousov
(74) *Attorney, Agent, or Firm* — David W. Victor; Konrad, Raynes, Davda and Victor LLP (57) ABSTRACT

Provided are a computer program product, system, and method for generating component pages to render in a configuration page in a graphical user interface (GUI) to configure a computing resource. A plurality of component pages are generated to render in the configuration page. Each component page includes user configuration setting controls to enable the user to set configuration parameters for component resources to configure the computer resource. The configuration page is generated to: render a main panel in the GUI program; render graphical component page selection controls in the GUI program associated with the component pages; receive user selection of a selected one of the graphical component page selection controls associated with one of the component pages; and render the component page associated with the selected graphical component page selection control.

19 Claims, 8 Drawing Sheets

FIG. 1

Component Page Information

FIG. 2

Component Resource Setting

FIG. 3

Dependency Information Instance

GENERATING COMPONENT PAGES TO RENDER IN A CONFIGURATION PAGE IN A GRAPHICAL USER INTERFACE TO CONFIGURE A COMPUTING RESOURCE

BACKGROUND OF THE INVENTION

1. Field of the Invention

The present invention relates to a computer program product, system, and method for generating component pages to render in a configuration page in a graphical user interface to configure a computing resource.

2. Description of the Related Art

There are two types of configuration programs to guide a user through a chain of configuration settings to configure a computing resource, dialogs and guided actions, such as a configuration wizard. The dialog technique operates by providing dialog pages, where each page is relevant to one step of the chain of configuration settings and is autonomous in that one page is not dependent on the other. The user must succeed in the configuration in one dialog page, and only when configurations in one page successfully complete will the dialog open a different dialog and continue to the next dialog page and configuration operations. However, with the dialog technique, if one dialog page is blocked due to a dependency of a setting entered through an earlier dialog page, the user may need to close the dialog, open another, and then fix the problem by going back to the previous dialog page in which the conflicting setting was introduce. With the dialog pages, the user is not aware of where in the dialog pages the problem occurred to allow the user to proceed to the correct dialog page to enter the correct setting.

The other type of configuration technique involves guided action, also referred to as a wizard, to guide the user through a set of actions where at the end all the actions are committed if there are no dependency conflicts in entered settings. The issue with the guided action technique is that the guided action program does not provide the user with sufficient information to know all dependencies and prerequisites while performing the configuration in a particular panel and before proceeding to the next panel. Thus, the error may not be introduced until after several panels into the wizard, which makes it difficult for the user to determine the cause of the error in order to take actions to fix the problem.

There is a need in the art for improved techniques for providing a user interface to configure a computational resource.

SUMMARY

Provided are a computer program product, system, and method for generating component pages to render in a configuration page in a graphical user interface (GUI) to configure a computing resource. A plurality of component pages are generated to render in the configuration page. Each component page includes user configuration setting controls to enable the user to set configuration parameters for component resources to configure the computer resource. The configuration page is generated to: render a main panel in the GUI program; render graphical component page selection controls in the GUI program associated with the component pages; receive user selection of a selected one of the graphical component page selection controls associated with one of the component pages; and render the component page associated with the selected graphical component page selection control.

DETAILED DESCRIPTION

Described embodiments provide techniques for configuring parameters for a computing resource to be configured by providing configuration pages to a user through a configuration GUI that enables the user to go backwards and forwards in the configuration pages of configuration parameters to enter values at any point in the chain of configuration settings. Described embodiments generate pages having graphical component page selection controls for each configuration page of configuration parameters to allow the user to select any configuration page having configuration parameters to configure. Further described embodiments provide information on dependency conflicts in a manner to allow the user to go to the configuration pages having the configuration parameters that conflict so the user may readily correct any conflicting entered values for configuration resources.

Described embodiments generate configuration pages that allow the user to process a chain of ordered pages of configuration parameters in a predefined order, but then if there is a dependency problem noted or a change needs to be made out of order in the configuration pages, the user may use the component page selection controls rendered in the GUI to readily proceed to any other page of configuration parameters to adjust settings. Further, in described embodiments information is provided on dependency problems in the configuration pages having the configuration parameters producing the conflict. This allows the user to readily navigate to the different configuration pages with the configuration parameters producing the conflicts so the user may correct the conflicting parameter values to avoid the conflict.

Further, the graphical component page selection controls provide information on a number of unapplied configuration parameters in the pages to allow the user to access those configuration pages having parameters that need to be configured, all the while receiving information on any dependency conflicts that arise as a result of new entered values for configuration parameters.

Figure 1:
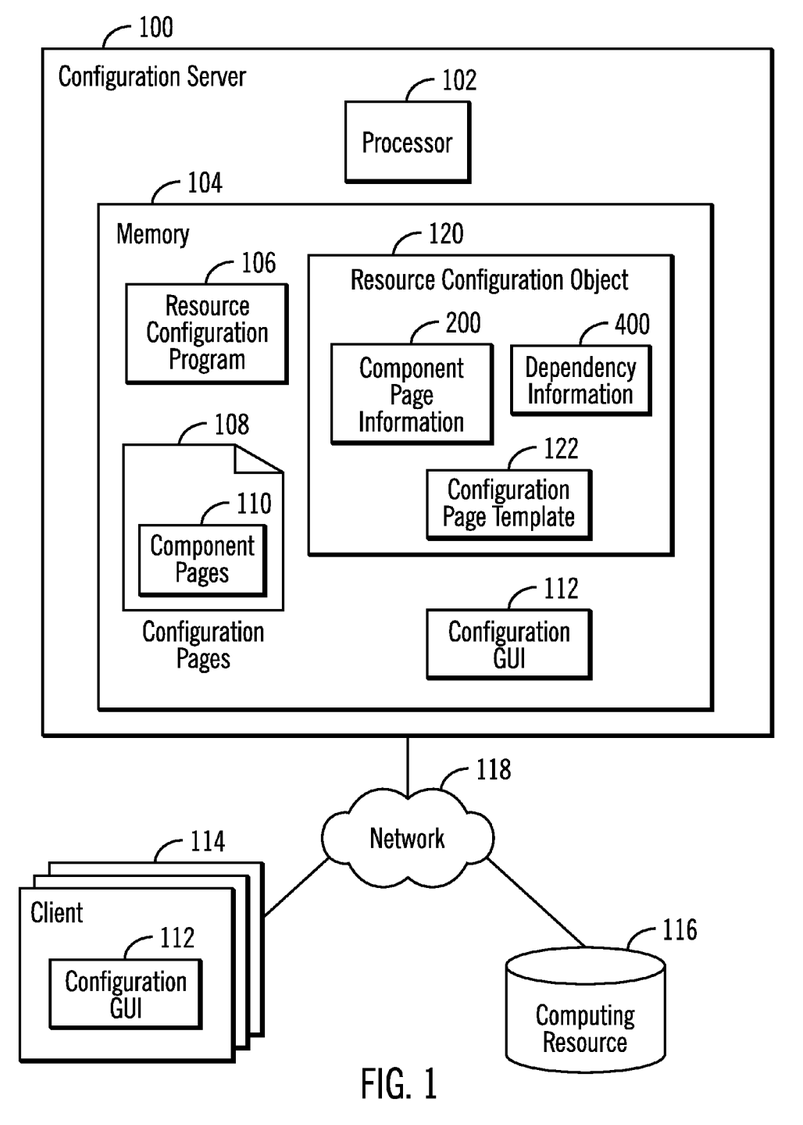
FIG. 1 illustrates an embodiment of a computing environment.

FIG. 1 illustrates an embodiment of a computing environment including a configuration server 100 having a processor 102 and a main memory 104 including a resource configuration program 106 for generating configuration pages 108 comprising component pages 110 of user interface controls to render in a configuration graphical user interface (GUI) 112 running in client systems 114 and the server 100 to configure a connected computing resource 116 connected. The configuration pages 108 each include component pages 110 having user interface controls to configure the connected computing resource 116 over a network 118. The configuration program 106 may also generate configuration pages 108 to configure computing resources 116 in and directly connected to the clients 114 and the system 100.

The resource configuration program 106 generates the configuration pages 108 from information maintained in a resource configuration object 120 including component page information 200 providing information on component pages 110 rendered in the configuration pages 108; a configuration page template 122 providing a layout of how the component pages 110 are presented in the configuration page 108; and dependency information 400 indicating potential conflicts for values entered for configuration parameters for component resources which must be configured or set to configure the computing resource 116. The configuration server 100 may transmit the configuration pages 108 to the client systems 114 over the network 114 to render in their configuration GUIs 108 to allow computing resources 116 to be configured from different clients 114 and the server 100.

To render the configuration user interface in the configuration GUI 112, the resource configuration program 106 may generate configuration pages 108 having user interface controls and content loaded into the configuration GUI 112. The configuration pages 108 and their component pages 110 may be encoded using Hypertext Markup Language (HTML), Extended Markup Language (XML) and additional software frameworks, browser extensions, plugins, etc. that render graphics and other user interface components, such as ActiveX®, Adobe Flash®, JavaFX®, Java® Applets, JavaScript®, etc. (In many countries, ActiveX is a registered trademark of Microsoft Corporation; Adobe Flash is a registered trademark of Adobe Systems Inc.; and Java, JavaScript, and JavaFX are registered trademarks of Oracle America, Inc.) The configuration GUI 112 may comprise a program suitable for rendering configuration pages 108, 110 of user interface controls, such as a web browser or desktop application program. The configuration GUI 112 and the generated configuration pages 108 may be rendered on a display screen at the system 100 and clients 114, and input received through a user input device, such as a mouse, keyboard, voice activation, touch sensitive screen, etc.

When generating the user interface controls in the configuration page 108 and component pages 110, a new page may be generated or graphic changes may be rendered through a plugin, browser extension or other graphics delivery mechanisms generated within the current page 114 loaded in the configuration GUI 112.

The memory device 104 may comprise suitable devices known in the art for functioning as a main memory of a computer system, such as a Random Access Memory (RAM), Dynamic RAM (DRAM), Static DRAM (SDRAM), storage-class memory (SCM), Phase Change Memory (PCM), resistive random access memory (RRAM), spin transfer torque memory (STM-RAM), conductive bridging RAM (CBRAM), etc.

The computing resource 116 to configure may be comprised of component resources for which configuration parameter values need to be provided in order to configure the computing resource 116. In one embodiment, the server 100 and clients 114 connect to the computing resource 116 over the network 118. Alternatively, the server 100 and clients 114 may be connected to the computing resource 116 over direct connections, such as a serial cable, Universal Serial Bus (USB) or other type of direct connections.

In one embodiment, the computing resource 116 may comprise a storage resource such as a storage volume, and the component resources may comprise resources to configure in order to configure the storage volume, such as storage pools, a system for the volume, a domain for the volume, and resources used to manage the data being stored, such as compression, encryption, replication, etc. The component resources to configure may be organized in the component pages 110 according to a preferred ordering selected by the developer of the resource configuration object 120. The computing resource 116 may comprise other types of hardware devices and programs, such as backup programs, database programs, workflow programs, etc.

Figure 2:
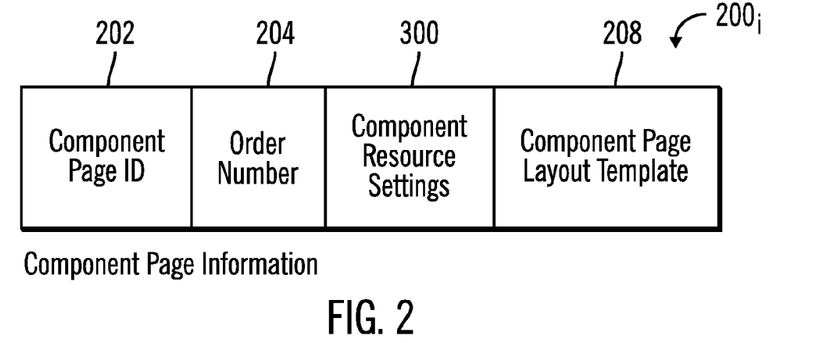
FIG. 2 illustrates an embodiment of component page information.

FIG. 2 illustrates an instance of component page information $200_i$ in the resource configuration object 120 used to generate the component pages 110 in the configuration page 108, including a page identifier (ID) 302 identifying the component page $110_i$; an order number 204 indicating an order of the component page 202 in a component page ordering of all the pages 110; component resource settings 300 providing the configuration parameters for the component resources configured in the component page 202; and a component page layout template 206 that provides a layout of configuration setting controls the user may manipulate to set values for configuration parameters for component resources configured in the component page 202.

A developer determines the preferred ordering 204 of the component pages 108 in which the user enters values for component resources to provide an organized flow in which the user enters settings taking into account dependencies and a preferred ordering for the user to enter settings to avoid dependency conflicts and optimize the settings. The user may also select the configuration setting controls for different configuration parameters for component resources to include in the component pages 110 and organize the presentation of the configuration parameters in the pages 110, which themselves are organized in the configuration page 108.

Figure 3:
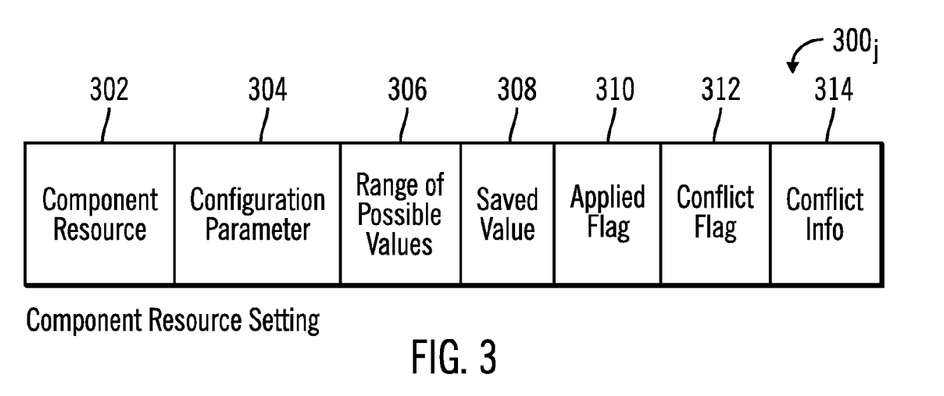
FIG. 3 illustrates an embodiment of a component resource setting for component resources to be configured in a configuration page.

FIG. 3 illustrates an instance of a component resource setting $300_j$ of the component resource settings 300 in the component page information $200_i$ to configure a particular component resource that needs to be configured in order to configure the ultimate computing resource 116. A component resource setting $300_j$ includes a component resource 302 which is being configured in the particular component page $110_i$ defined through component page information $200_i$, e.g., storage pools, storage allocated, storage settings, etc; a configuration parameter 304 being configured, such as a setting for the component resource; a range of possible values 306 for the configuration resource which may be rendered in the component page $110_i$ for the user to view to select an appropriate value in the range; a saved value 308 the user entered for the configuration parameter 304; an applied flag 310 indicating whether the user selected to apply the saved value 308, which means it is indicated as ready to use for the final configuration for the computing resource 116 when all other component resource settings 300 for all the pages 110 are completed; a conflict flag 312 indicating whether the saved value 308 has a dependency conflict with any other saved values for any other component resource settings 300 in any of the other pages 110; and conflict information 314 providing information describing a nature of the dependency conflict.

For instance, if the component resource is a system being used for the configuration, the configuration parameter may identify a particular system in the network, if the component resource is a storage pool, then the configuration parameter for the user to configure may comprise a storage pool, if the configuration parameter is a volume, then the configuration parameter may indicate a volume size, whether the volume is compressed or not, and other configuration settings.

In certain embodiments, the user entered settings, such as the saved value 308, applied flag 310, conflict flag 312, and conflict information 314 may be maintained locally at the client 114 or server 100 where the configuration GUI 112 is rendering the configuration page 108 or may be maintained at the server 100 and saved for a user account to provide persistent storage of these user entered settings. The server 100 may then supply the GUI 112 executing the configuration page 108 with the saved values.

Figure 4:
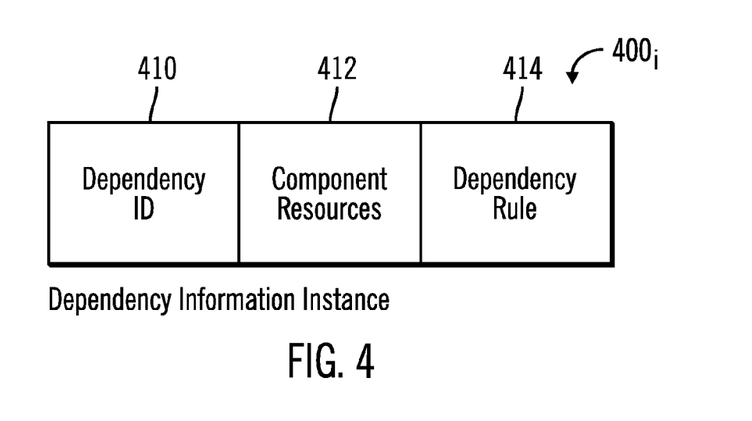
FIG. 4 illustrates an embodiment of dependency information for determining dependency conflicts of entered configuration setting values.

FIG. 4 illustrates an embodiment of an instance of dependency information $400_i$ maintained with the dependency information that has a dependency identifier 410; component resources 412 that are subject to the potential dependency conflict; and a dependency rule 414 indicating a rule for comparing saved values for the configuration parameters of the component resource 412 to determine if there is a dependency conflict, such as if the user selected a storage pool component resource that did not have enough storage space for a volume size configuration setting set by the user, or the storage pool could not support other requested features, such as transfer speed, compression, etc.

Figure 5:
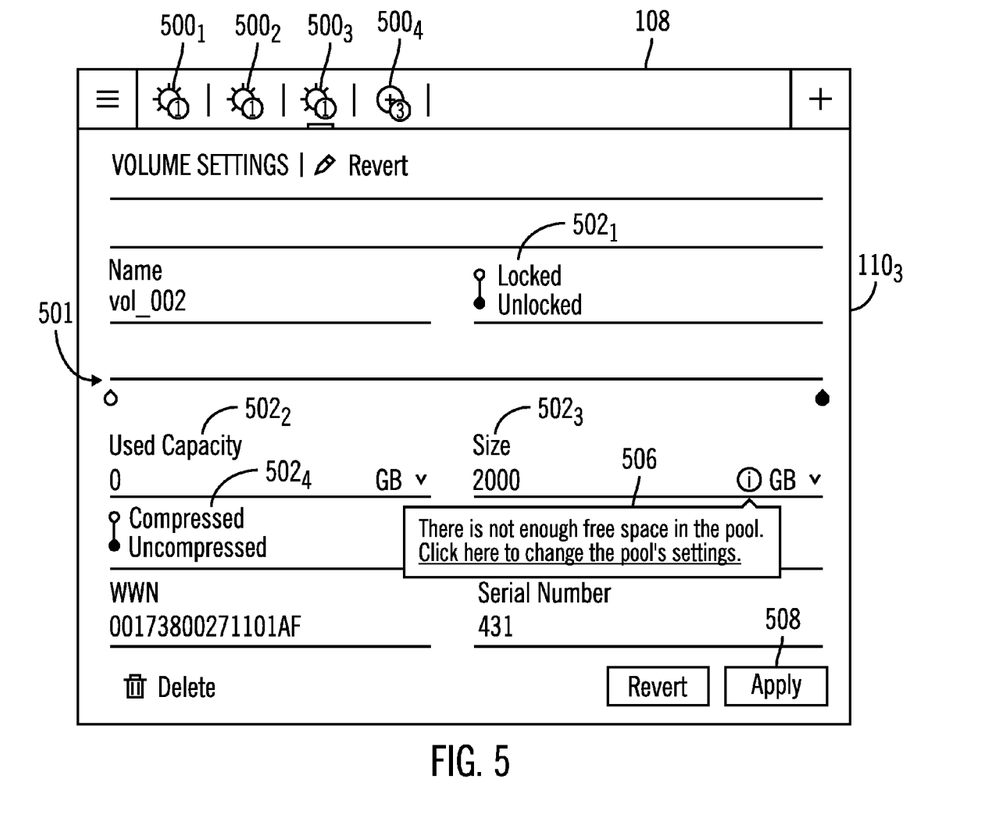
FIGS. 5 and 6 illustrate examples of configuration pages rendered in a configuration graphical user interface (GUI) panels to enter values for configuration parameters displayed in the configuration pages rendered in the configuration GUI.
Figure 6:
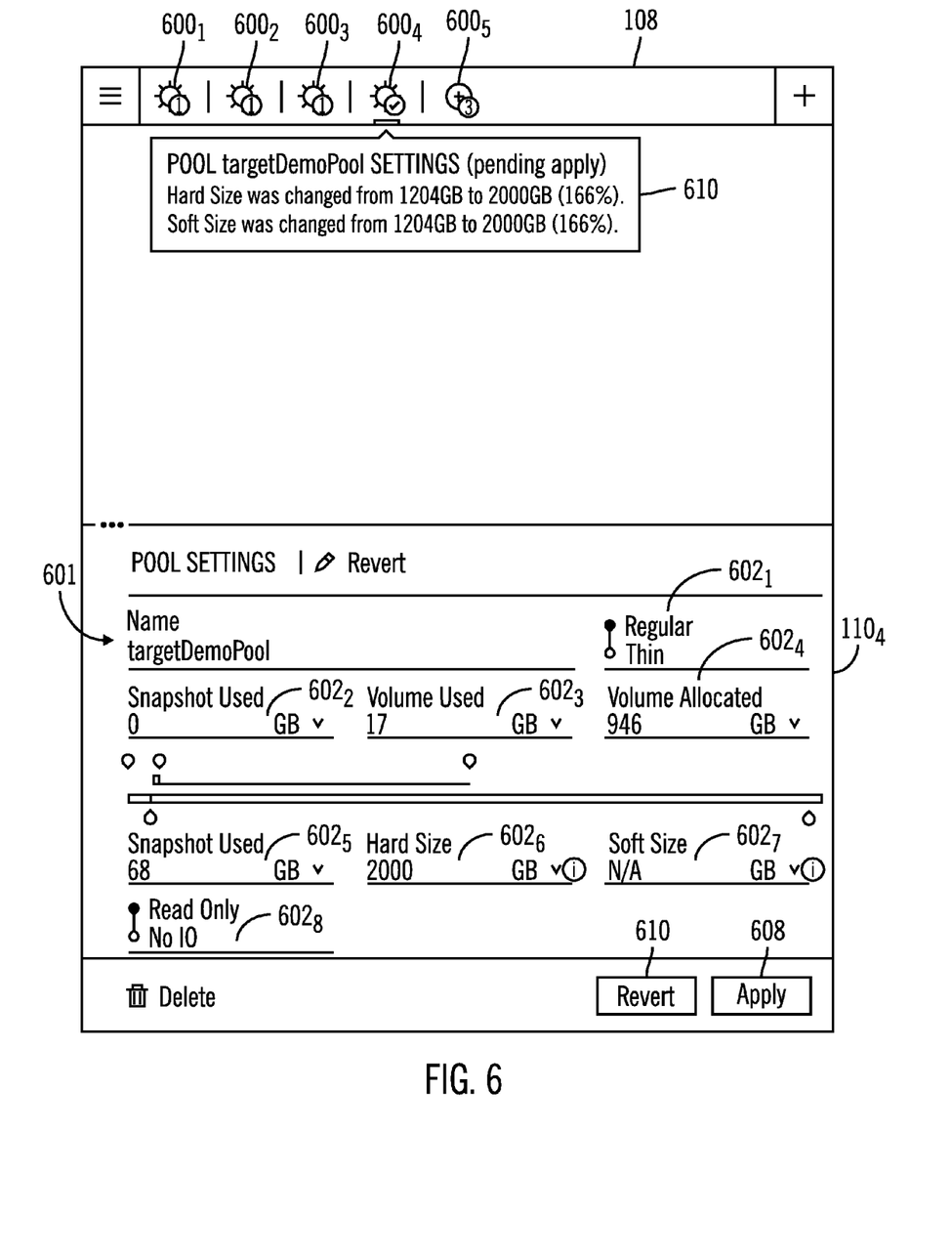

FIGS. 5 and 6 illustrate examples of how the configuration GUI 112 renders the component pages 110 in the configuration page 108 to configure a volume computing resource 116. FIG. 500 shows a third component page $110_3$ rendered in a main panel 501 of the configuration page 108 having configuration setting controls $502_1$, $502_2$, $502_3$, and $502_4$ for component resources such as the volume being locked or unlocked, an unused capacity, volume size, and a compression setting, respectively. The main panel 501 of the configuration page 108 comprises the region in which the current component page $110_i$ and its configuration selection controls, saved values 308, and configuration settings for component resources are rendered. The configuration page 108 renders graphical component page selection controls $500_1$, $500_2$, $500_3$, and $500_4$ that may be selected to cause the rendering of a corresponding component page $110_1$, $110_2$, $110_3$, and $110_4$ in the main panel 501. In FIG. 5, the current selected graphical component page selection control $500_3$ renders the third component page $110_3$ in the ordering. Further, each of the component page selection controls $500_1$, $500_2$, $500_3$, and $500_4$ render information indicating a number of configuration parameters $502_1$, $502_2$, $502_3$, and $502_4$ in the corresponding component page $110_i$ that have not been applied in that page, which for page $110_3$ comprises three unapplied configuration parameters. The number of unapplied configuration parameters are shown in the graphical component page selection controls $500_1$, $500_2$, $500_3$, and $500_4$ for the other of the pages. This visually signals to the user the component pages that have configuration parameters that need to be configured for component resources within a component page $110_i$.

Further, FIG. 5 shows a conflict message 506 being displayed indicating a conflict with the selected volume size of 2000 GB, as conflicting with the free space in the pool setting. If there are no conflicts, then the user may select the apply graphical control 508 to change the state of a saved value 308 to applied 310. In FIG. 5 the apply graphical control 508 is rendered in an unselectable state because the presence of the dependency conflict as displayed 506 prevents a user from selecting the apply graphical control 508 to apply the conflicting value.

FIG. 6 shows another example of the rendering of the configuration page 108 in the configuration GUI 112 after all the configuration settings in the fourth component page $110_4$ have been applied, as represented by displaying a checkmark in the component page selection control $600_4$ for the rendered page $110_4$. Values for configuration settings may be entered in the main panel 601 of the configuration page 108 through the configuration setting controls $602_1$, $602_2$ . . . $602_8$ for configuration parameters for component resources related to the pool settings for configuring the storage pool that will be used for the volume computing resource. The component page $110_4$ provides configuration parameters for component resources such as indication of whether the pool is thin or regular, whether a snapshot is used for the storage pool, the storage space for the pool that is used in volumes, the storage space allocated to volumes, a snapshot size, a physical space allocated (hard size), and whether the pool is read only. In this way the component page $110_4$ rendered in FIG. 6 allows the user to select component resources for configuring the pool settings, which is the fourth ordered page of parameters to configure when configuring a volume Further, FIG. 6 displays a message 610 for the settings configured in the selected component page selection control $602_4$ providing information on changes applied for configuration settings entered into component page $110_4$ rendered in the configuration page 108. FIG. 6 also shows the apply graphical control 608 as unselectable because all values for configuration settings have been applied. The user would have to select the revert graphical control 610 to change any of the applied values.

Figure 7:
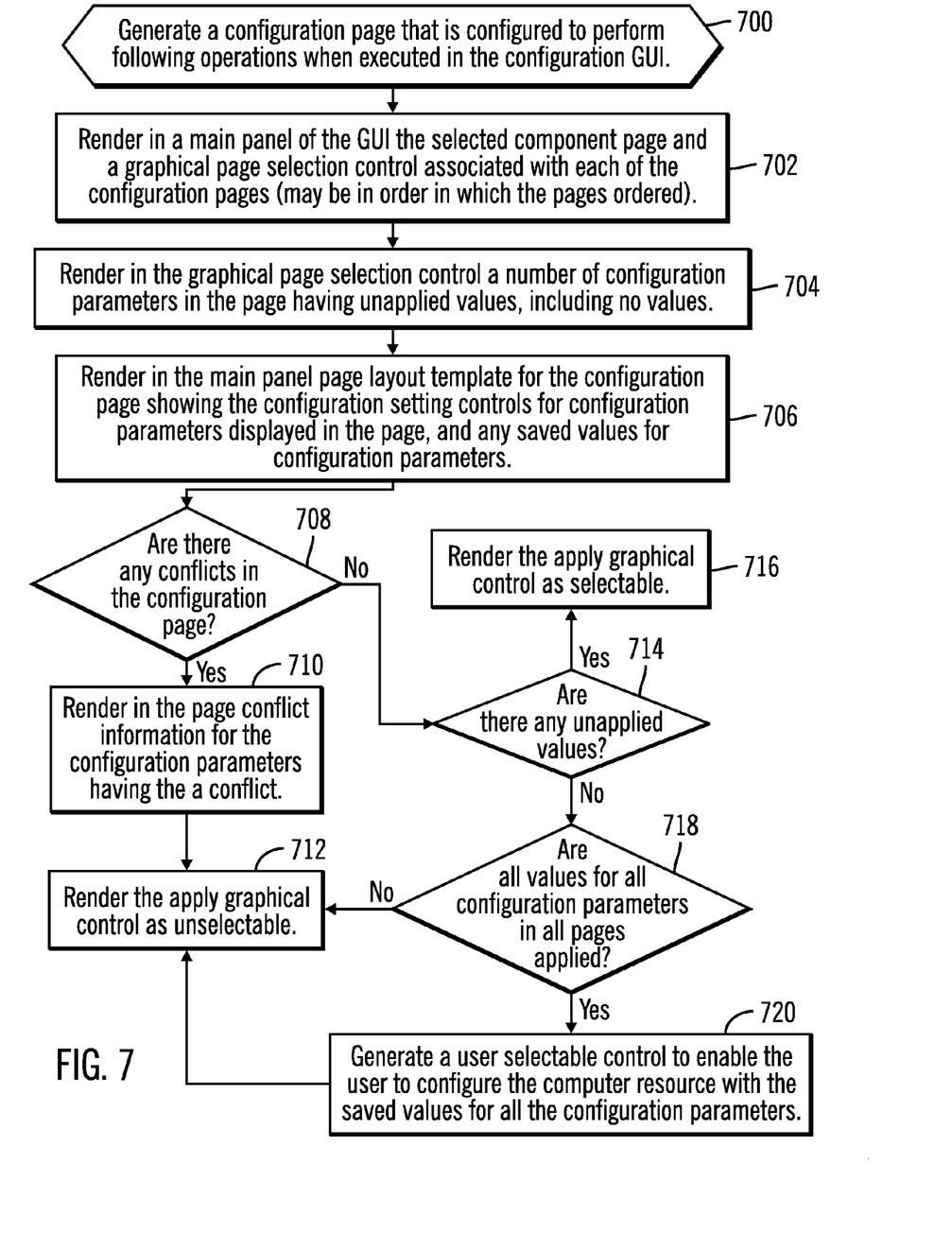
FIG. 7 illustrates an embodiment of operations to generate a configuration page to configure a computing resource.

FIG. 7 illustrates the resource configuration program 106 generating the configuration page 108 that when loaded and executed in the configuration GUI 12 causes the rendering, receiving of user input, and the determinations recited in blocks 702 through 720. The configuration page 108 causes various determinations that drive what is rendered by making determinations internally through the configuration GUI 112 executing code embedded in the configuration page 108 and/or by interacting with the resource configuration program 106 that may be maintained locally in the client 114 or remotely in the server 110. The resource configuration program 106 may receive input from the configuration GUI 112 executing the configuration page 108 and make certain determinations to control how the configuration page 108 renders in formation in the GUI 112.

The configuration page 108 renders (at block 702) in a main panel 501, 601 of the configuration GUI 112 the selected component page $110_i$ and graphical component page selection controls, e.g., $500_1$, $500_2$, $500_3$, $500_4$, $600_1$, $600_2$ . . . $600_5$, associated with the component pages 110, rendered in the order in which the component pages 110 are ordered. A number of configuration parameters in each of the component pages that has unapplied values 308, as indicated in applied flag 310, or no value is rendered (at block 706) in the graphical component page selection control, e.g., $500_1$, $500_2$, $500_3$, $500_4$, $600_1$, $600_2$ ... $600_5$.

The configuration page 108 renders (at block 706) in the main panel 501, 601 of the configuration page 108 the page layout template 208 for the component page $110_i$ showing the configuration setting controls e.g., $502_1$, $502_2$, $502_3$, $502_4$, $602_1$, $602_2$ ... $602_8$ for configuration parameters displayed in the component page $110_i$ and any saved values 308 for configuration parameters 304.

The configuration page 108 causes a determination (at block 708) of whether there are any dependency conflicts with saved values 308 for the configuration parameters in any component page 110. A dependency conflict may be determined if any of the saved values 308 for configuration parameters in the component page $110_i$ conflict with any saved values 308 for configuration parameters in any of the other pages 110 according to dependency rules 414 in the dependency information $400_i$ applicable to the saved values in the displayed component page $110_i$. If (at block 708) there are dependency conflicts of values 308 in the component page 110—then information on the page conflict, e.g., 506, from the conflict information 314, is rendered in the page $110_i$ for the configuration parameters having the conflict. When there is a conflict, the apply graphical control 508, 608 is rendered (at block 712) as unselectable.

If (at block 708) there is no dependency conflict for the saved values for the rendered page $110_i$, the configuration page 108 causes a determination (block 716) of whether there are also unapplied values 308, i.e., having the applied flag 310 indicating unapplied. If there are unapplied values 308, then the apply graphical control 508, 608 would be rendered (at block 716) as selectable to allow the user to change the status (i.e., applied flag 310) for a saved value 308 to applied, which means the saved value 308 is ready to apply to the component resource of the computing resource 116. If (at block 714) there are no unapplied values, then the configuration page 108 causes (at block 718) a determination whether all values for all configuration parameters in all the pages are applied. If (at block 718) all saved values 308 for all the configuration parameters rendered in all the configuration pages 108 are applied, i.e., the applied flag 310 set, then the resource configuration program 106 generates (at block 720) a user selectable control to enable the user to configure the computer resource 130 with all the applied saved values 130 for all the configuration parameters set through the pages 110. If (at block 718) a page has no unapplied values but all the values for all the configuration parameters in all other pages are not applied, then the resource configuration program 108 renders (at block 712) the apply graphical control 508, 608 in the page having all configuration parameter values applied as unselectable.

The configuration page 108 causes determinations, such as whether there are dependency conflicts, unapplied values, and whether all values for all configuration parameters are applied by executing code or plugins embedded in the configuration page 108 or by interacting with a remote or local application, web server, resource configuration program 108, to make the determinations based on information stored locally at the client 114 or at a shared server 100.

The described operations of FIG. 7 generate a configuration page 108 in which component page selection controls are rendered as separate controls to allow the user to navigate through the different component pages 110 to render the configuration parameters and user configuration setting controls for one of multiple pages in any order, and to cause determination of how to display a apply graphical control as unselectable if there are no more configuration parameters to set for the rendered page $110_i$.

Figure 8:
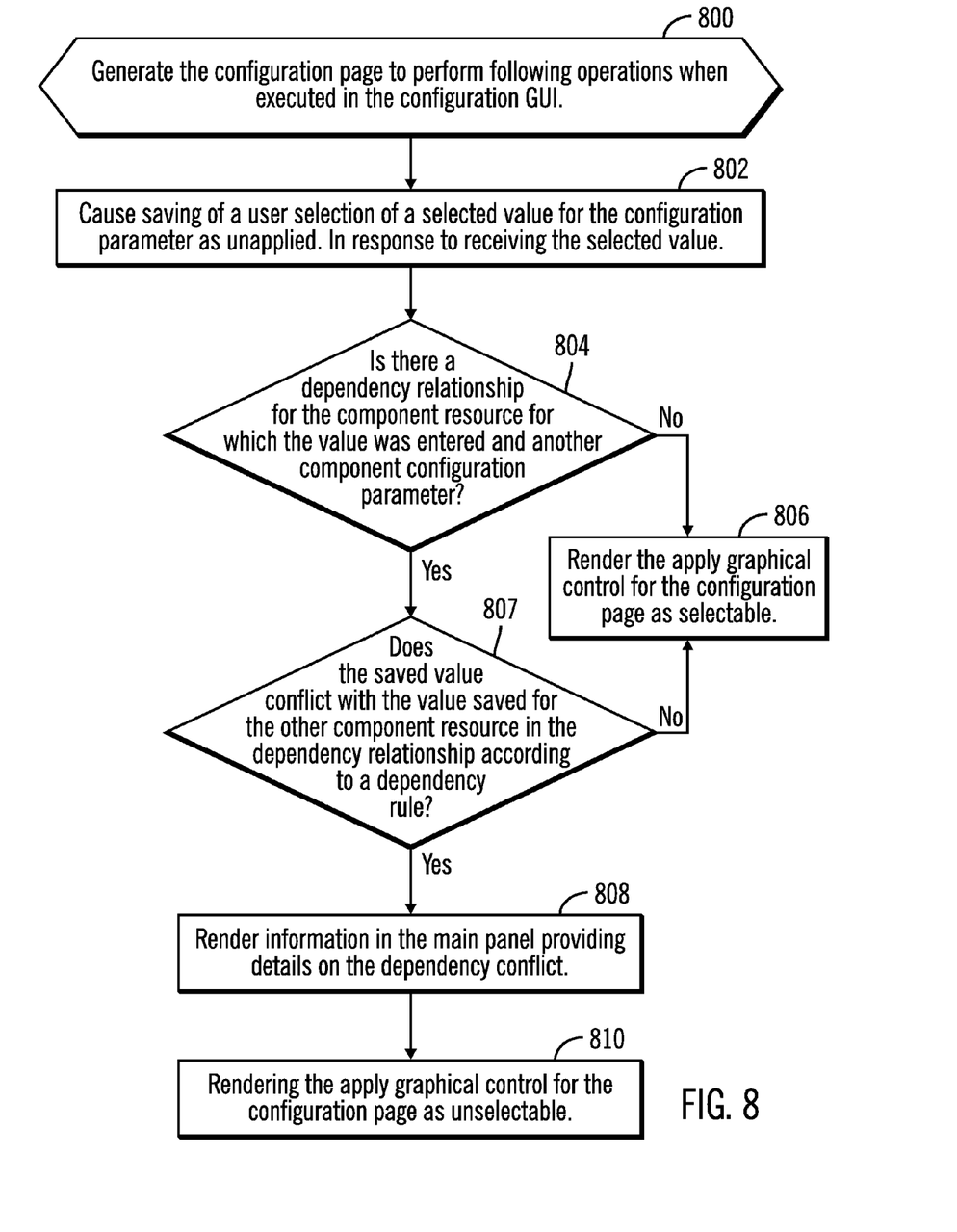
FIG. 8 illustrates an embodiment of operations to process user entry of a value for a configuration parameter in the configuration page rendered in the configuration GUI.

FIG. 8 illustrates the resource configuration program 106 generating the configuration page 108 that when loaded and executed in the configuration GUI 12 causes the rendering, receiving of user input, and the determinations recited in blocks 802 through 810. The configuration page 108 causes various determinations that drive what is rendered by making determinations internally using code configured in the configuration page 108 and/or by interacting with a resource configuration program 106 that may be maintained locally in the client 114 or remotely in the server 110. The configuration page 108 is generated to cause (at block 802) the saving of a user selection of a selected value 308 for the configuration parameter as unapplied in response to receiving user selection of a value through the configuration setting controls e.g., $502_1$, $502_2$, $502_3$, $502_4$, $602_1$, $602_2$ ... $602_8$ for one of the unapplied configuration parameters rendered in the component page $110_i$. By saving the value 308 even if unapplied, the value is saved as the user may navigate to different configuration pages 108. Thus, any entered value is saved to provide persistency of saved values. The saved values may be stored locally where the configuration GUI 112 is executing or at a remote site maintaining user entries for configuration pages 108.

After saving the unapplied value 308, if (at block 804) the configuration page 108 causes a determination that there is a dependency relationship, i.e., dependency information instance $400_i$ for the component resource for which the value was entered and another component in any of the pages 110, then the configuration page 108 causes a determination to be made (at block 808) as to whether the saved value 308 just entered conflicts with the value saved for the other component resource 412 in the dependency relationship according to a dependency rule 414.

If (at block 804) the configuration page causes a determination that there is no dependency relationship $400_i$ for the component resource for which the value was provided or if (at block 808) there is no dependency conflict according to the dependency rule 414, then the configuration program 108 renders (at block 806) the apply graphical control 508, 608 for the rendered component page $110_i$ in the main panel of the configuration GUI 112 as selectable. If (at block 807) the saved value 308 does conflict with another saved value for another configuration parameter in any of the pages 110, then the configuration page 108 renders (at block 808) information 506 (FIG. 5) in the main panel of the GUI 112 providing details on the specific dependency conflict, such as maintained in the conflict information 314 for the component resource setting $300_i$, for which the value 308 is provided. When there is a conflict, the apply graphical control 508, 608 is rendered (at block 810) as unselectable.

Figure 9:
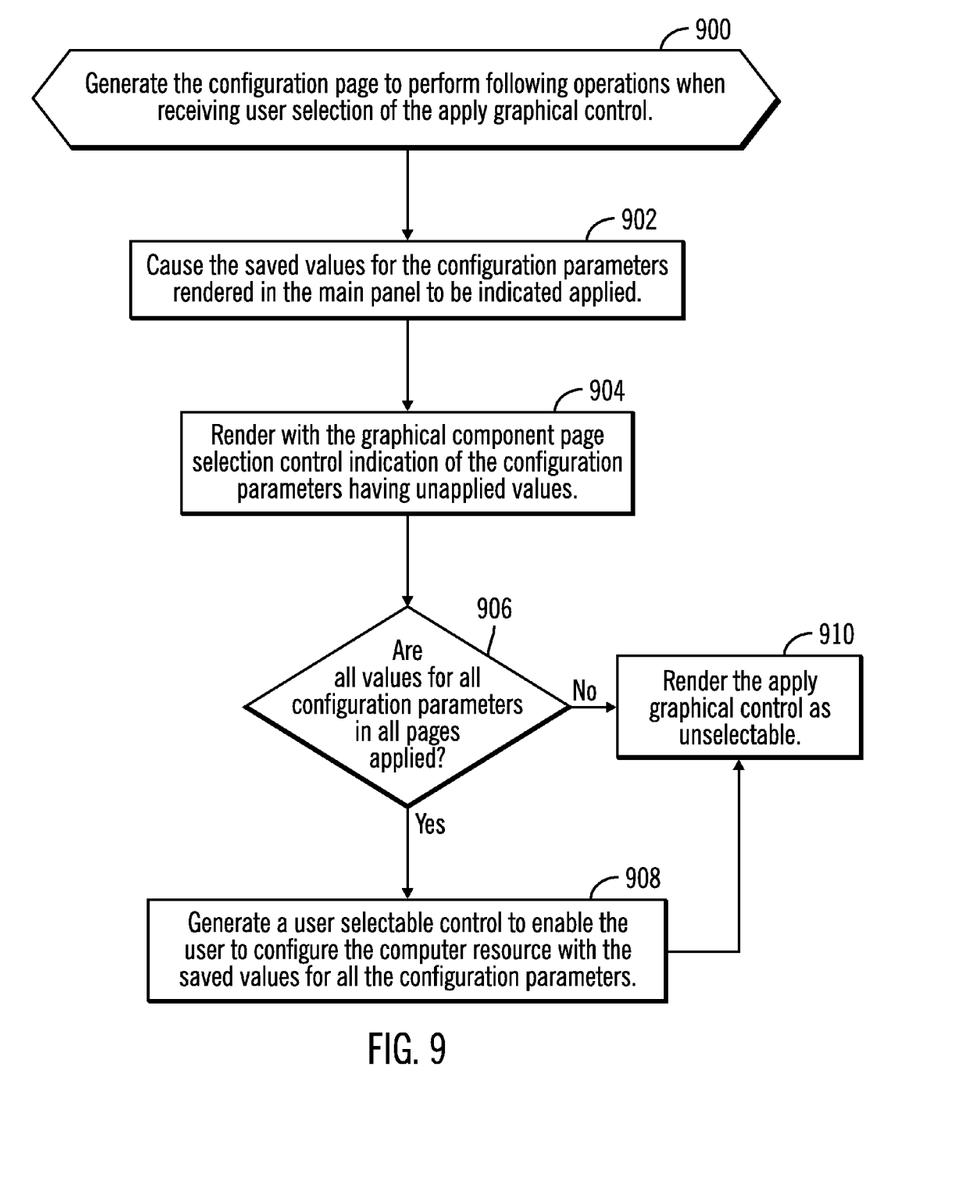
FIG. 9 illustrates an embodiment of operations to process user selection to apply saved values for configuration parameters.

FIG. 9 illustrates the resource configuration program 106 generating the configuration page 108 that when loaded and executed in the configuration GUI 112 processes user selection of the apply graphical control 508, 608 to apply any saved values 308. Upon receiving (at block 900) user selection of a selectable apply graphical control 508, 608, the configuration page 108 causes (at block 902) saved values 308 for the configuration parameters rendered and selectable for the rendered page 110$i$ in the GUI 112 to be indicated (at block 902) as applied, such as by setting the applied flag 310 to indicate applied. The number of unapplied values rendered in the graphical component page selection controls graphical component page selection control, e.g., $500_1$, $500_2$, $500_3$, $500_4$, $600_1$, $600_2$ ... $600_5$ is rendered (at block 904). The rendering at block 904 may update the number of unapplied value information to reflect a new number of fewer unapplied values, which was just reduced by the applying operation at block 900.

If (at block 906) all saved values 308 for all the configuration parameters rendered in all the configuration pages 108 are applied, i.e., the applied flag 310 set, then the resource configuration program 106 generates (at block 908) a user selectable control to enable the user to configure the computer resource 130 with all the applied saved values 130 for all the configuration parameters that may be set through the pages 110. If (at block 906) the rendered page 110$_i$ has no unapplied values but all the values for all the configuration parameters in all other pages are not applied, then the resource configuration program 108 renders (at block 1010) the apply graphical control 508, 608 in the page having all configuration parameter setting values applied as unselectable.

Described embodiments provide techniques to present an ordered chain of configuration pages in which the user may enter values for configuration parameters to configure a computing resource. Further provided are graphical component page selection controls to allow the user to navigate to different pages of configuration parameters to enter values for configuration settings out of order and to address any noted dependency conflicts that arise through the settings.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

Figure 10:
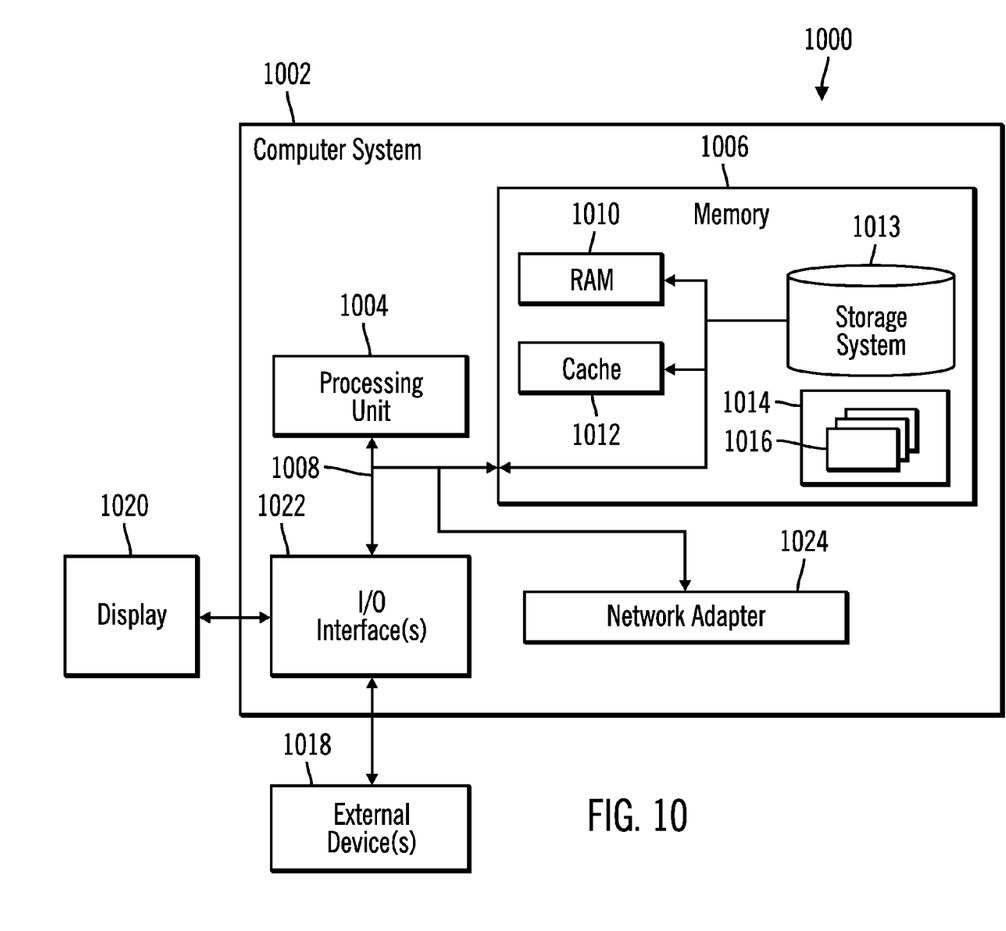
FIG. 10 illustrates a computing environment in which the components of FIG. 1 may be implemented.

The computer system 100 and computational components of FIG. 1 may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components may be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating a configuration page rendered in a graphical user interface (GUI) program to use to configure a computer resource, the computer program product comprising a computer readable storage medium having computer readable program code embodied therein that executes to perform operations, the operations comprising:
   generating a plurality of component pages to render in the configuration page, wherein each component page includes user configuration setting controls to enable a user to set configuration parameters for component resources to configure the computer resource; and
   generating the configuration page to:
      render a main panel in the GUI program;
      render graphical component page selection controls in the GUI program associated with the component pages;
      receive user selection of a selected one of the graphical component page selection controls associated with one of the component pages;
      render the component page associated with the selected graphical component page selection control;
      save user entered values for configuration parameters, entered in a plurality of the component pages, as indicated as unapplied;
      receive user selection for a rendered component page of the plurality of component pages to indicate as applied all the saved user entered values for configuration parameters indicated as unapplied that are selectable through the rendered component page; and
      render a user selectable control to enable the user to configure the computer resource with the saved user entered values for all the configuration parameters in response to all the saved user entered values for all the configuration parameters in all the component pages indicated as applied.

2. The computer program product of claim 1, wherein the configuration page is further generated to render the graphical component page selection controls according to a specified ordering indicating a preferred order in which configuration parameters presented in the component pages should be entered to satisfy dependency relationships of the configuration parameters.

3. The computer program product of claim 1, wherein the configuration page is further generated to render each of the graphical component page selection controls with information indicating a number of configuration parameters not having applied values in the component page associated with the graphical component page selection control.

4. The computer program product of claim 1, wherein the configuration page is further generated to:
   receive through one of the configuration setting controls on the component page rendered in the main panel user selection of a value for one of the configuration parameters; and
   render conflict information in the main panel indicating a dependency conflict in response to a determination that there is a dependency conflict between the user selected value for the configuration parameter of the component resource and a value provided for another component resource having a dependency relationship with the component resource for which the user selected value is provided.

5. The computer program product of claim 4, wherein the dependency conflict is determined by:
   accessing dependency information indicating a plurality of dependency relationships between component resources configured in any of the pages, wherein each of the dependency relationships indicates a dependency rule that determines whether the values for the component resources in the dependency relationship are in conflict;
   determining whether one of the dependency relationships is between the component resource for which the value was entered and another component resource; and
   in response to determining that there is the dependency relationship, determining according to the dependency rule for the dependency relationship whether the user selected value conflicts with the value provided for the other component resource in the dependency relationship.

6. The computer program product of claim 5, wherein the dependency conflict is determined by at least one of the GUI program executing code embedded in the configuration page and a resource computing program that communicates with the GUI program executing the configuration page.

7. The computer program product of claim 1, wherein the configuration page is further generated to:
   render in the main panel an apply graphical control for the unapplied saved value, wherein the receive user selection for the rendered component page comprises user selection of the apply graphical control; and
   cause the saved user entered values for the configuration parameters for the component parameter page rendered in the main panel to be indicated as applied in response to receiving user selection of the apply graphical control.

8. The computer program product of claim 7, wherein the configuration page is further generated to render in the GUI program each of the graphical component page selection controls with information indicating a number of configuration parameters in the configuration page associated with the graphical component page selection control that have no entered value or a saved value indicated as unapplied.

9. The computer program product of claim 7, wherein the configuration page is further generated to render in the GUI program the apply graphical control as unselectable in response to determining that there is at least one dependency conflict between one of the saved user entered values for one of the component resources indicated in the component page rendered in the main panel and a value saved for another component resource whose configuration parameter is indicated in any of the component pages.

10. A system for generating a configuration page rendered in a graphical user interface (GUI) program to use to configure a computer resource, comprising:
a processor; and
a computer readable storage medium having program code that when executed by the processor performs operations, the operations comprising:
generating a plurality of component pages to render in the configuration page, wherein each component page includes user configuration setting controls to enable a user to set configuration parameters for component resources to configure the computer resource; and
generating the configuration page to:
render a main panel in the GUI program;
render graphical component page selection controls in the GUI program associated with the component pages;
receive user selection of a selected one of the graphical component page selection controls associated with one of the component pages;
render the component page associated with the selected graphical component page selection control;
save user entered values for configuration parameters, entered in a plurality of the component pages, as indicated as unapplied;
receive user selection for a rendered component page of the plurality of component pages to indicate as applied all the saved user entered values for configuration parameters indicated as unapplied that are selectable through the rendered component page; and
render a user selectable control to enable the user to configure the computer resource with the saved user entered values for all the configuration parameters in response to all the saved user entered values for all the configuration parameters in all the component pages indicated as applied.

11. The system of claim 10, wherein the configuration page is further generated to render the graphical component page selection controls according to a specified ordering indicating a preferred order in which configuration parameters presented in the component pages should be entered to satisfy dependency relationships of the configuration parameters.

12. The system of claim 10, wherein the configuration page is further generated to render each of the graphical component page selection controls with information indicating a number of configuration parameters not having applied values in the component page associated with the graphical component page selection control.

13. The system of claim 10, wherein the configuration page is further generated to:

receive through one of the configuration setting controls on the component page rendered in the main panel user selection of a value for one of the configuration parameters; and
render conflict information in the main panel indicating a dependency conflict in response to a determination that there is a dependency conflict between the user selected value for the configuration parameter of the component resource and a value provided for another component resource having a dependency relationship with the component resource for which the user selected value is provided.

14. The system of claim 10, wherein the configuration page is further generated to:
render in the main panel an apply graphical control for the unapplied saved value, wherein the receive user selection for the rendered component page comprises user selection of the apply graphical control; and
cause the saved user entered values for the configuration parameters for the component parameter page rendered in the main panel to be indicated as applied in response to receiving user selection of the apply graphical control.

15. A method for generating a configuration page rendered in a graphical user interface (GUI) program to use to configure a computer resource, comprising:
generating a plurality of component pages to render in the configuration page, wherein each component page includes user configuration setting controls to enable a user to set configuration parameters for component resources to configure the computer resource; and
generating the configuration page to:
render a main panel in the GUI program;
render graphical component page selection controls in the GUI program associated with the component pages;
receive user selection of a selected one of the graphical component page selection controls associated with one of the component pages;
render the component page associated with the selected graphical component page selection control;
save user entered values for configuration parameters, entered in a plurality of the component pages, as indicated as unapplied;
receive user selection for a rendered component page of the plurality of component pages to indicate as applied all the saved user entered values for configuration parameters indicated as unapplied that are selectable through the rendered component page; and
render a user selectable control to enable the user to configure the computer resource with the saved user entered values for all the configuration parameters in response to all the saved user entered values for all the configuration parameters in all the component pages indicated as applied.

16. The method of claim 15, wherein the configuration page is further generated to render the graphical component page selection controls according to a specified ordering indicating a preferred order in which configuration parameters presented in the component pages should be entered to satisfy dependency relationships of the configuration parameters.

17. The method of claim 15, wherein the configuration page is further generated to render each of the graphical component page selection controls with information indicating a number of configuration parameters not having applied values in the component page associated with the graphical component page selection control.

18. The method of claim 15, wherein the configuration page is further generated to:
- receive through one of the configuration setting controls on the component page rendered in the main panel user selection of a value for one of the configuration parameters; and
- render conflict information in the main panel indicating a dependency conflict in response to a determination that there is a dependency conflict between the user selected value for the configuration parameter of the component resource and a value provided for another component resource having a dependency relationship with the component resource for which the user selected value is provided.

19. The method of claim 15, wherein the configuration page is further generated to:
- render in the main panel an apply graphical control for the unapplied saved value, wherein the receive user selection for the rendered component page comprises user selection of the apply graphical control; and
- cause the saved user entered values for the configuration parameters for the component page rendered in the main panel to be indicated as applied in response to receiving user selection of the apply graphical control.

* * * * *